Nov. 19, 1968  J. T. MAUPIN  3,412,293
BURNER CONTROL APPARATUS WITH PHOTODARLINGTON FLAME DETECTOR
Filed Dec. 13, 1965
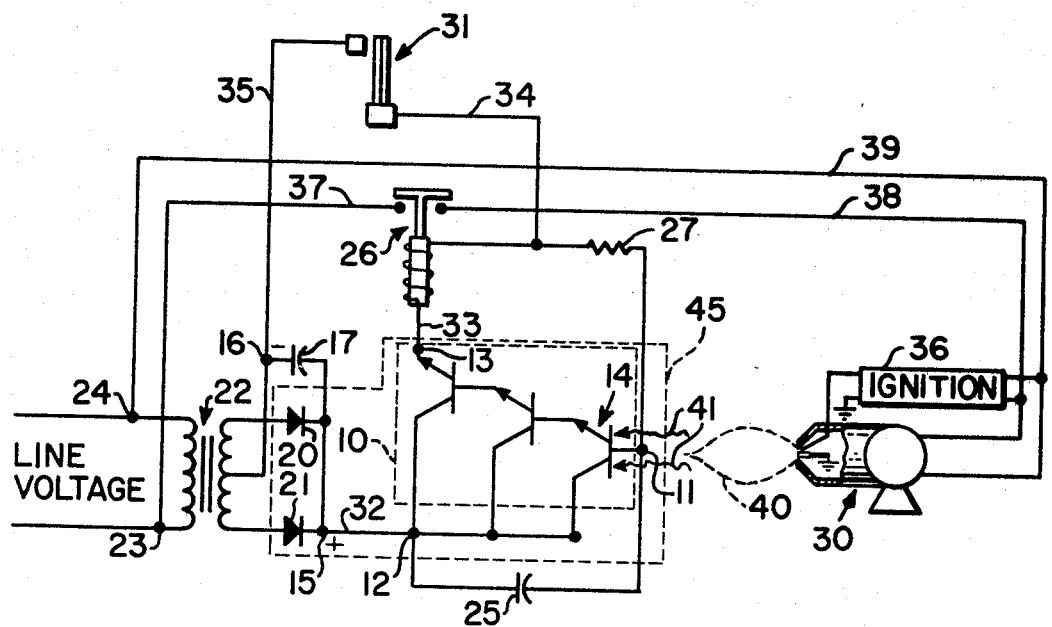
INVENTOR.
JOSEPH T. MAUPIN
BY
ATTORNEY

United States Patent Office 3,412,293
Patented Nov. 19, 1968

3,412,293
BURNER CONTROL APPARATUS WITH PHOTO-DARLINGTON FLAME DETECTOR
Joseph T. Maupin, Deephaven, Minn., assignor to Honeywell Inc., Minneapolis, Minn., a corporation of Delaware
Filed Dec. 13, 1965, Ser. No. 513,320
9 Claims. (Cl. 317—130)

ABSTRACT OF THE DISCLOSURE

A three-stage photodarlington semiconductor device is connected to energize a burner control relay. A thermostat charges a timing capacitor by means of a circuit which includes the input of the photodarlington to thereby energize the relay only so long as the capacitor charges. The photodarlington is exposed to the burner flame to maintain the relay energized after the capacitor has received a full charge.

This invention relates to control apparatus, and more particularly to a timing apparatus for use in a burner control system.

Many systems have been proposed for causing the fuel supply to be shut off after a predetermined length of time if the burner in a heating system does not properly ignite. The present invention provides an improved, solid state timing apparatus for de-energizing the burner upon elapse of a predetermined length of time after actuation of condition responsive switching means if the burner has not ignited. The invention utilizes a solid state switching device which is responsive to an applied control current and to applied electromagnetic wave energy. Control current is applied, through timing means, for a predetermined length of time to actuate the switching device. The device is adapted to be positioned to view the burner and remains actuated if a flame appears. If no flame has appeared after the predetermined time, the device deactuates and de-energizes the burner.

The single figure is a schematic circuit diagram of a burner control system utilizing the invention.

Referring now to the drawing, switching means, here shown as a three stage photodarlington semiconductor device generally designated 10, is actuable in response to an applied control current and/or to applied electromagnetic wave energy. That is, photodarlington 10 be maintained in a low impedance state by either applied control current or applied electromagnetic energy. Photodarlington 10 is adapted to be positioned to view condition changing means, such as gun type oil burner 30, which normally produces a flame 40 and electromagnetic wave energy, designated by arrow 41, when operative. Photodarlington 10 includes a control electrode 11 and first and second load current carrying electrodes 12 and 13. The input transistor 14 of photodarlington 10 is a phototransistor with its base forming control electrode 11 and its collector junction being photoresponsive. Photodarlington 10 is adapted to be energized from a filtered DC source having a positive terminal 15 and a negative terminal 16. Filtered DC is provided by a filter capacitor 17 and a pair of rectifiers 20 and 21 appropriately connected to the center tapped secondary of a transformer 22 whose primary terminals 23 and 24 are adapted to be connected to line voltage. Timing means, such as timing capacitor 25, are connected between first load current carrying electrode 12 and control electrode 11. Second load current carrying electrode 13 is adapted to be connected to one end of electrically energizable load means, here shown as relay 26 having a normally open switch. Photodarlington gain limiting means, for example feedback resistor 27, has one end connected to control electrode 11 and the opposite end adapted to be connected to the opposite end of the load means.

Condition responsive means such as bimetallic thermostat 31 for normally controlling operation of burner 30 are adapted to be positioned in the space to be heated by burner 30. Circuit means are adapted to connect thermostat 31 in circuit with relay 26 and photodarlington 10 to control ignition of burner 30. The circuit may be traced from positive terminal 15 through a conductor 32, first and second load current carrying terminals 12 and 13 of photodarlington 10, then through a conductor 33, the winding of relay 26, a conductor 34 to thermostat 31 and finally through a conductor 35 to negative terminal 16.

An energizing circuit for an ignition circuit 36 and burner 30 can be traced from line voltage terminal 23 through a conductor 37, the load relay terminals, than through a conductor 38 to a parallel connection of ignition circuit 36 and burner 30 and a conductor 39 to second line voltage terminal 24.

The operation of the system is as follows. When the temperature in the space to be conditioned drops, thermostat 31 closes. Timing capacitor 25 begins to charge and charge current flows from positive terminal 15 to control electrode 11 turning on photodarlington 10. Load current then flows from positive terminal 15 through load current carrying terminals 12 and 13 energizing relay 26. When relay 26 pulls in, it completes the circuit for energizing burner 30 and ignition circuit 36. If ignition occurs and flame 40 is produced, electromagnetic wave energy 41 is generated. Electromagnetic wave energy 41 impinges upon the photosensitive junction of photodarlington 10 and generates photocurrent. The photocurrent generated maintains photodarlington 10 in its low impedance state and relay 26 remains energized. Upon occurrence of flame 40, capacitor 25 discharges through conductive photodarlington 10 so that timing is repeated the next time thermostat 31 calls for heat and flame 40 is out.

In the event that burner 30 does not ignite within a predetermined length of time after energization, it is de-energized. De-energization takes place in the following manner. Timing capacitor 25 provides the initial control current to turn on photodarlington 10. Due to extremely high gain of this device, practical values of control current are in the $10^{-7}$ amp region and modest values of capacitance will produce the required timing intervals. The current through timing capacitor 25 drops as it nears its fully charged state. When the current drops below a predetermined value, it will not be sufficient to keep photodarlington 10 turned on. If no flame has occurred by that time to cause generation of a photocurrent, photodarlington 10 turns off thereby breaking the circuit to relay 26 causing it to open the burner and ignition circuit which de-energizes burner 30. The current required to maintain photodarlington 10 in the low impedance state is determined by the design of the device. The time during which current in excess of that amount is supplied through timing capacitor 25 is determined by the choice of that capacitor. As long as burner 30 ignites properly, it is controlled by actuation and de-actuation of thermostat 31. Photodarlington 10 controls only when thermostat 31 calls for heat and flame 40 fails to appear within the predetermined time. If the flame accidentally goes out, and does not re-ignite during the aforementioned time delay interval, the photodarlington will turn off, closing off fuel supply to the burner.

Resistor 27 limits the gain of the photodarlington 10 annd thereby stabilizes the load current. Unstabilized darlington circuits are known to have wide gain fluctuations, so use of such a feedback or gain limiting resistor is quite important to proper operation of the circuit. A stabilized circuit gain of about $10^5$ can be obtained by using a $10^8$ ohm resistor 27 and a 1000 ohm load 26. When such a high valued resistor 27 is used, a very high impedance signal source is required to keep photodarlington 10 in the low impedance state. The photocurrent source can be considered essentially a constant current source having infinite impedance; therefore it satisfies the requirement and operates photodarlington 10 at a substantially constant gain.

The portion of the system shown within dotted box 45 may be constructed in integrated semiconductor form, encapsulated in a container adapted to transmit electromagnetic waves to the photoresponsive junction, and positioned in the vicinity of the blast tube of burner 30 to view flame 40. As a consequence, the installation of the system is extremely simple and compact.

I claim:

1. Control apparatus for use with electrically energizable load means which is controlled by condition responsive means responsive to the need for operation of condition changing means, the load means, when energized, normally rendering the condition changing means operative, and the condition changing means, when operative, producing electromagnetic wave energy, the apparatus comprising:

switching means having a control electrode and first and second current carrying electrodes, said switching means being actuable in response to either the application of a control current to said control electrode or to the application of electromagnetic wave energy to said control electrode, said switching means control electrode being adapted to be positioned to view the condition changing means;

circuit means adapted to be controlled by the condition responsive means and connecting the switching means first and second current carrying electrodes in circuit with the load means to energize said load means upon said switching means being actuated; and timing means adapted to be controlled by the condition responsive means and connected to apply control current to the switching means control electrode for a predetermined length of time upon a need for operation of the condition changing means so that the load means is only temporarily energizable unless the condition changing means produces electromagnetic wave energy to maintain the switching means actuated.

2. The apparatus of claim 1 wherein the timing means includes capacitor means.

3. The apparatus of claim 1 wherein the switching means is semiconductive switching means.

4. The apparatus of claim 3 wherein the semiconductive switching means includes amplifying means.

5. The apparatus of claim 3 wherein the semiconductive switching means includes a phototransistor whose photosensitive element comprises said control electrode.

6. The apparatus of claim 5 wherein the phototransistor photosensitive element includes a base and a photosensitive collector junction and the timing means includes capacitor means connected to the base.

7. The apparatus of claim 3 wherein the semiconductive switching means includes a multistage photodarlington semiconductor device whose photosensitive element comprises said control electrode.

8. The apparatus of claim 7 wherein the photodarlington photosensitive element includes a photosensitive junction, and wherein the circuit means includes means adapted to connect said first current carrying electrode to one end of the load means and which apparatus further comprises:

photodarlington gain limiting means having one end connected to said control electrode and the opposite end adapted to be connected to the opposite end of the load means.

9. The apparatus of claim 8 wherein the timing means includes a capacitor connected between said second current carrying electrode and said control electrode.

References Cited

UNITED STATES PATENTS

| | | | |
|---|---|---|---|
| 2,948,815 | 8/1960 | Willems et al. | 250—211 |
| 3,001,077 | 9/1961 | Van Overbeek et al. | 250—211 |
| 3,238,423 | 3/1966 | Guiffrida | 317—130 X |
| 3,270,799 | 9/1966 | Pinckaers | 317—130 X |
| 3,280,333 | 10/1966 | Hyman et al. | 250—211 X |
| 3,294,974 | 12/1966 | Riebs | 250—206 |

JOHN F. COUCH, *Primary Examiner.*

J. D. TRAMMELL, *Assistant Examiner.*

UNITED STATES PATENT OFFICE
CERTIFICATE OF CORRECTION

Patent No. 3,412,293                                November 19, 1968

Joseph T. Maupin

It is certified that error appears in the above identified patent and that said Letters Patent are hereby corrected as shown below:

Column 4, line 2, "energizable" should read -- energized --.

Signed and sealed this 31st day of March 1970.

(SEAL)
Attest:

Edward M. Fletcher, Jr.                      WILLIAM E. SCHUYLER, JR.
Attesting Officer                                Commissioner of Patents